Patented May 26, 1942

2,284,610

UNITED STATES PATENT OFFICE 2,284,610

DISPERSION OF PIGMENTS IN RUBBER

Harold A. Sweet, Westfield, N. J., assignor to General Dyestuff Corporation, New York, N. Y., a corporation of New York No Drawing. Application September 20, 1937, Serial No. 164,757

1 Claim. (Cl. 260—4)

The present invention relates to the dispersion of pigments in rubber, a process for the preparation of the pigment compositions and the product so produced.

It is common practice in the art at the present time to incorporate dyestuffs and pigments in rubber during milling and prior to vulcanization to obtain colored rubber vulcanizates following vulcanization. Considerable time is required according to this method in order to obtain a satisfactory compounding of the pigment with the rubber. Furthermore, in this method, when a dry color is employed, there is considerable danger of dusting which causes contamination of one color with another. This method is, therefore, decidedly unsatisfactory from a commercial standpoint.

A method has been suggested in U. S. Patent 1,846,820 of February 23, 1932, for dispersing coloring agents in rubber in a way which overcomes the objections inherent in the procedure previously mentioned. According to this method, water-insoluble coloring agents are mixed with latex, which is subsequently coagulated and then milled to produce what may be termed a "master batch" for subsequent utilization in the coloring of rubber goods. While this method has advantages over the previously known method, it nevertheless possesses disadvantages which operate to offset to a certain extent the desirable results attendant upon the use of the process. Thus, uniform products cannot always be obtained, due to the fact that rubber latex, especially as obtained for use in the United States, varies in composition. Again coloring agents dispersed in rubber deteriorate in storage as a result of the oxidation of the rubber, different complex compounds thereby being formed. Finally, when stored for a considerable period of time, the rubber tends to decompose and, when in this condition, cannot be properly dispersed in a rubber compound. For this reason, difficulties are experienced in dispersing in rubber a "master batch" of rubber latex and pigment which has been coagulated and stored for some time.

I have now discovered that the objections which manifest themselves in exploiting such "master batches" are overcome if the "master batches" are composed of a coloring agent dispersed in a high molecular weight iso-olefine polymer. Compositions consisting of coloring agents and such polymers may be dispersed in rubber very quickly and easily with the production of a uniformly colored product. The high molecular weight isoolefine polymers, since they are substantially saturated, are much less susceptible to oxidation in air than is rubber, and as a consequence "master batches" according to my invention may be stored for considerable periods of time without danger of decomposition or deterioration. In addition, such compositions not only are capable of uniformly coloring the rubber in which they are dispersed, but also have the capacity of imparting to the rubber a higher di-electric strength and a greater plasticity due to the presence of the iso-olefine polymer. Another important advantage in my procedure is the avoidance of the step of drying to remove excess water, a manipulation necessary to the success of the process heretofore mentioned.

It is accordingly an object of my invention to devise a process for the uniform dispersion of coloring agents in rubber.

It is a further object of my invention to produce a composition comprising a coloring agent which may be readily and easily dispersed in rubber.

A further object of the invention resides in a composition of a coloring agent and a high molecular weight isoolefine polymer which may be separately made up and subsequently employed as desired for the coloring of rubber.

Other objects of the invention will be apparent from the following detailed description.

Iso-olefine polymers within the contemplation of my invention may be from viscous liquid to solid in appearance, depending upon the molecular weight which they possess. The molecular weight of such polymers usually ranges from 5000 upward, the lower weight polymer being of a more or less liquid consistency and the higher weight polymer of a rubber-like appearance. Said polymers are prepared preferably by the polymerization of iso-olefines with a metal halide catalyst of the Friedel-Crafts type, while maintaining the temperature below minus 10° C. (French Patent 740,407).

If it be desired to produce polymers of a molecular weight ranging upward from about 28,000 to about 250,000, it is necessary to employ a highly purified iso-olefine in order to insure that there will not be present such impurities as sulphur, olefines of more than 4 carbon atoms, oxygen-containing derivatives of olefines and alkyl halides which have the effect of poisoning the metal halide catalyst, thereby preventing the reaction from leading to the desired high molecular weight polymers. The production of such high molecular weight polymers is described in the application of Mueller-Cunradi and Otto, Ser. No. 145,828 filed June 1, 1937.

According to the present invention any of said iso-olefine polymers having a molecular weight of from above 12,000, preferably those from isobutylene, may be employed with good results. If such a polymer, but of relatively high molecular weight, for instance that having a molecular weight above 60,000 be employed, a composition of pigment and polymer is obtained which is somewhat stiff. The isobutylene polymers, having a molecular weight below 16,000, give a softer and somewhat more plastic sheet and for some purposes may therefore be preferred.

Any coloring agent, that is dyestuff or pigment utilized for the coloring of rubber, may be employed in my process. I have found, however, that products having the best properties are obtained when there are utilized as the coloring agent those water-insoluble azo dyestuffs which are fast to vulcanization. Dyestuffs of this type are described in U. S. Patents 1,897,129, 1,920,407, 1,932,577, 1,977,936, 1,995,902, 2,006,211, Reissue 17,364 and Patent 1,962,511. The fact that these dyestuffs are not susceptible to bleeding from rubber and the further fact that they are very stable towards vulcanization recommends their use in my process. It is to be understood however, that the use of other dyestuffs, as well as inorganic pigments, such as, for example, those known as Pigment Green and Chrome Yellow, are within the scope of my invention.

The incorporation of the coloring agents in the iso-olefine polymers is a relatively simple expedient. Thus, the polymer is first broken down and made plastic in a mill such as a Werner and Pfleiderer or a Banbury mixer. The pigment is then added and is immediately taken up by the polymer, forming a highly colored mass of rubber-like material. This material may then be rolled to a sheet on a rubber mill and used in this condition as the need arises. It is incorporated in the rubber by milling in an ordinary Werner and Pfleiderer or a Banbury mixer, depending upon the plasticity of the sheet obtained, the Banbury being used for the stiffer sheets.

The polymer and coloring agent may be mixed in various proportions. I have incorporated as high as 2 parts by weight of coloring agent to 1 part by weight of polymer, specifically that of a molecular weight or from about 60,000 to 80,000. However, when the coloring agent greatly exceeds the quantity of polymer, the resulting "master batch" becomes somewhat stiff and hard and for this reason it is preferable to utilize about equal parts of coloring agent and polymer.

The following examples will serve to further illustrate my invention, but it is to be understood that my invention is not limited thereto.

*Example 1.*—8 parts by weight of the isobutylene polymer sold under the trade name of "Vistanex MM" and having a molecular weight of from 60,000 to 80,000 are milled on an ordinary rubber rolling mill until the product is made plastic. There are then added 8 parts by weight of the dyestuff resulting from the combination of tetrazotized 3.3'-dichlor-4.4'-diamino-diphenyl with 1-phenyl-5-pyrazolone-3-carboxylic acid ethyl esters. The dyestuff is quickly taken up by the polymer whereby a highly colored red mass of a rubber-like material is obtained. This product is then rolled into a sheet and is used for the coloring of the following composition for the manufacture of bathing caps:

| | Parts |
|---|---|
| Pale crepe | 750 |
| Tuads master batch [5% Tuads (tetramethyl-thiuram-disulfide) and 95% pale crepe rubber] | 13 |
| Zinc oxide | 50 |
| Califix whiting (calcium carbonate) | 120 |
| Stearic acid | 4 |
| Captax (mercapto-benzothiazole) | 7.5 |
| Sulphur | 16 |

The resulting composition, upon being cured with sulphur chloride, produced a uniformly and highly colored rubber product.

*Example 2.*—The "master batch" of coloring agent and polymer of Example 1 is used to color the following composition employed for the manufacture of rubber sheeting:

| | Parts |
|---|---|
| Pale crepe rubber | 750 |
| Magnesium carbonate | 30 |
| Califix whiting | 120 |

Upon curing the resulting composition with sulphur chloride, a homogeneous and highly colored product is obtained.

*Example 3.*—4 parts of the polymer of Example 1 are plasticized in a Banbury mixer and there are then added thereto 8 parts of the dyestuff resulting from the tetrazotization of 2.2'-dichlor-5.5'-dimethoxy-4.4'-diamino-diphenyl and its coupling with 2 mols of acetoacetic acid metaxylidide. The resulting composition, after sheeting on a rubber mill and incorporation with the rubber composition of Example 1 gives a uniformly colored composition which, upon conversion by means of vulcanization, results in a very desirable rubber product.

*Example 4.*—4 parts of the polymer of Example 1 are worked up with 4 parts of the dyestuff of Example 3 and the composition, after sheeting, blended with the rubber composition of Example 1.

*Example 5.*—5 parts of the polymer of Example 1 are blended with 5 parts of the dyestuff of Example 3 according to the procedure of Example 1. The composition, following the sheeting thereof, is then used to color the following rubber composition:

| | Parts |
|---|---|
| Pale crepe rubber | 100 |
| Blanc fixe (precipitated barium sulphate) | 56.5 |
| Suprex white (clay) | 30 |
| Saint Joseph zinc oxide | 10 |
| Sulphur | 2 |
| Altax (benzothiazyl disulphide) | 1.25 |
| Zimate (zinc dimethyldithiocarbamate) | 0.25 |

The resulting colored composition was cured with sulphur chloride for 8 minutes at 287° F. with the formation of a uniformly highly colored product.

*Example 6.*—5 parts of a mixed isobutylene polymer composition, consisting of 75% of a polymer of 60,000 to 80,000 molecular weight and 25% of a polymer of from about 12,000 to 16,000 molecular weight are blended as in Example 1 with 5 parts of the dyestuff resulting from the diazotization of 1-amino-2-methoxybenzene-(5-carboxyl-aminobenzene) and the coupling thereof with 2'.3'-hydroxynaphthoyl-1-amino-3-nitrobenzene. The composition thus obtained, after sheeting on a rubber mill, is used to uniformly color the rubber composition of Example 5. The resulting product is then vulcanized as in Example 5.

*Example 7.*—5 parts of the dyestuff of Example 1 are blended with 5 parts of a mixed isobutylene polymer composition consisting of 50% of a polymer of a molecular weight of 60,000 to 80,000 and 50% of a polymer of a molecular weight of from 12,000 to 16,000. The resulting composition, after being rolled into a sheet, is employed in the same manner as the coloring composition of Example 6.

*Example 8.*—5 parts of the dyestuff of Example 1 are blended with 5 parts of an isobutylene polymer of a molecular weight of from about 12,000 to 16,000 and the resulting composition, after being rolled into a sheet, is employed in the same manner as the coloring composition of Example 6. The sheet according to this example is more plastic than those of the preceding examples due to the employment of the lower molecular weight polymer.

Wherever the term "rubber" is used throughout the specification and claim it is to be construed as covering not only Hevea rubber, but all the botanical varieties of rubber, as well as synthetic rubber, reclaimed rubber and the like.

It is to be understood that various changes may be made in the details of my invention without departing from the scope thereof.

What I claim is:

The process of uniformly coloring vulcanizable rubber which consists in milling in the dry state about 1 to 2 parts of a water-insoluble color with about 1 part of a polyisobutylene selected from the class consisting of those having a molecular weight of 60,000 to 80,000 and blends thereof with a polyisobutylene having a molecular weight of from 12,000 to 16,000 in which the higher polymer constitutes at least 50% of the blend, and blending the resulting product with 10 to 94 times its weight of vulcanizable rubber.

HAROLD A. SWEET.